United States Patent
Shuto

(10) Patent No.: US 9,148,472 B2
(45) Date of Patent: Sep. 29, 2015

(54) SERVER, ELECTRONIC DEVICE, SERVER CONTROL METHOD, AND COMPUTER-READABLE MEDIUM

(71) Applicant: Kabushiki Kaisha Toshiba, Tokyo (JP)

(72) Inventor: Eita Shuto, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 202 days.

(21) Appl. No.: 13/763,176

(22) Filed: Feb. 8, 2013

(65) Prior Publication Data

US 2013/0259326 A1 Oct. 3, 2013

(30) Foreign Application Priority Data

Mar. 27, 2012 (JP) .................................. 2012-072519

(51) Int. Cl.
*G06K 9/00* (2006.01)
*H04L 29/08* (2006.01)

(52) U.S. Cl.
CPC ............ *H04L 67/06* (2013.01); *G06K 9/00228* (2013.01); *G06K 9/00* (2013.01); *G06K 2009/00328* (2013.01)

(58) Field of Classification Search
CPC ................ G06K 2009/00328; G06K 9/00228; G06K 9/72; H04L 67/06; H04L 12/5835; H04N 21/25435; H04N 21/4542; H04N 21/4728; H04N 21/44008; H04N 21/4622; H04N 1/00244; H04N 1/00424; H04N 5/232; H04N 5/23222; H04N 5/772; H04N 5/76; G06F 3/1454; G06F 19/3481; H04H 60/07; Y10S 707/99936; G09G 5/006; A63F 2300/572; H04W 4/20; A63B 2220/05; G10L 15/20; G10L 15/30; H04M 2250/74

USPC ......... 382/103, 115, 117, 118, 170, 190, 254, 382/177, 203; 348/77, 207, 231, 333
See application file for complete search history.

(56) References Cited

U.S. PATENT DOCUMENTS

| | | | |
|---|---|---|---|
| 6,035,061 A * | 3/2000 | Katsuyama et al. | 382/177 |
| 7,158,657 B2 * | 1/2007 | Okazaki et al. | 382/118 |
| 8,160,311 B1 * | 4/2012 | Schaefer | 382/118 |
| 2004/0192442 A1 * | 9/2004 | Wells et al. | 463/36 |

(Continued)

FOREIGN PATENT DOCUMENTS

| | | |
|---|---|---|
| JP | 11-055726 | 2/1999 |
| JP | 2002-324076 | 11/2002 |

(Continued)

*Primary Examiner* — Vu Le
*Assistant Examiner* — Aklilu Woldemariam
(74) *Attorney, Agent, or Firm* — William W. Schaal; Rutan & Tucker, LLP

(57) ABSTRACT

In one embodiment, there is provided a server. The server includes: a receiver configured to receive, from an electronic device, an instruction signal instructing the server to detect a name of a first person, positional information representing a position of the electronic device and an image data of the first person; an extractor configured to extract electronic devices existing within a certain range from the electronic device based on the positional information, wherein positional information of the electronic devices are stored in the server; a detector configured to detect the first person by performing face detection on persons who are associated with the extracted electronic devices using the image data of the first person; and an output module configured to output the name of the first person.

10 Claims, 8 Drawing Sheets

(56) References Cited

U.S. PATENT DOCUMENTS

| | | | |
|---|---|---|---|
| 2005/0144291 A1* | 6/2005 | Frank et al. | 709/227 |
| 2006/0256959 A1* | 11/2006 | Hymes | 379/433.04 |
| 2008/0123907 A1* | 5/2008 | Eura et al. | 382/118 |
| 2008/0192129 A1* | 8/2008 | Walker et al. | 348/231.2 |
| 2008/0319922 A1* | 12/2008 | Lawrence et al. | 705/36 R |
| 2009/0231441 A1* | 9/2009 | Walker et al. | 348/207.1 |
| 2011/0096197 A1* | 4/2011 | Kusaka et al. | 348/231.5 |
| 2011/0234784 A1* | 9/2011 | Sugino | 348/77 |
| 2011/0242395 A1* | 10/2011 | Yamada et al. | 348/333.02 |
| 2012/0020428 A1* | 1/2012 | Roth et al. | 375/295 |
| 2012/0084130 A1* | 4/2012 | Holberg | 705/14.25 |
| 2012/0210386 A1* | 8/2012 | Kim et al. | 725/148 |
| 2012/0316949 A1* | 12/2012 | Chen | 705/14.26 |
| 2013/0100266 A1* | 4/2013 | Salsman | 348/77 |
| 2013/0120425 A1* | 5/2013 | Kuwabara et al. | 345/582 |
| 2013/0174223 A1* | 7/2013 | Dykeman et al. | 726/4 |

FOREIGN PATENT DOCUMENTS

| | | |
|---|---|---|
| JP | 2006-165822 | 6/2006 |
| JP | 2006-268597 | 10/2006 |

\* cited by examiner

FIG. 5

| ELECTRONIC DEVICE | USER NAME | FACE DATA | POSITIONAL INFORMATION |
|---|---|---|---|
| ELECTRONIC DEVICE 10A | PERSON A | :-) | LONGITUDE ○○, LATITUDE XX |
| ELECTRONIC DEVICE 10B | PERSON B | :-) | LONGITUDE ○X, LATITUDE ○X |
| ELECTRONIC DEVICE 10C | PERSON C | :-) | LONGITUDE ○△, LATITUDE ○△ |
| ELECTRONIC DEVICE 10D | PERSON D | :-) | LONGITUDE X○, LATITUDE X△ |

51  52  53  54

SERVER, ELECTRONIC DEVICE, SERVER CONTROL METHOD, AND COMPUTER-READABLE MEDIUM

CROSS-REFERENCE TO RELATED APPLICATION

This application claims priority from Japanese Patent Application No. 2012-072519, filed on Mar. 27, 2012, the entire contents of which are hereby incorporated by reference.

BACKGROUND

1. Field

Embodiments described herein relate to a server, an electronic device, a server control method, and a computer-readable medium.

2. Description of Related Art

In recent years, an electronic device is connected to a server, and thus it possible to acquire desired information from the server and to display the acquired information.

For example, an exemplary system is disclosed in which personal information including name of persons who are acquainted in a business or a social meeting.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention:

FIG. 5 is a diagram illustrating an example of a table having information about the plurality of the electronic devices, wherein the information is stored in a storage module of the server according to the exemplary embodiment;

DETAILED DESCRIPTION

According to exemplary embodiments of the present invention, there is provided a server. The server includes: a receiver configured to receive, from an electronic device, an instruction signal instructing the server to detect a name of a first person, positional information representing a position of the electronic device and an image data of the first person; an extractor configured to extract electronic devices existing within a certain range from the electronic device based on the positional information, wherein positional information of the electronic devices are stored in the server; a detector configured to detect the first person by performing face detection on persons who are associated with the extracted electronic devices using the image data of the first person; and an output module configured to output the name of the first person.

Hereinafter, embodiments of the present invention will be described with reference to the accompanying drawings.

Figure 1:
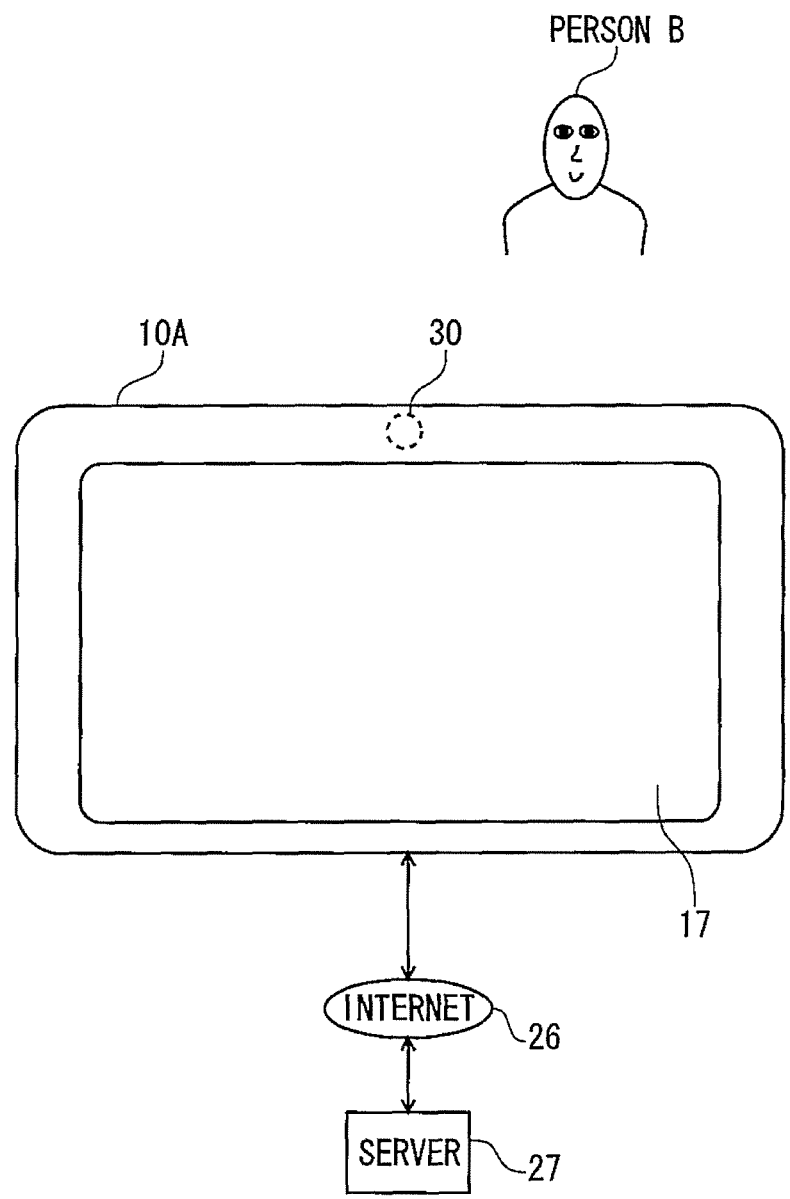
FIG. 1 is a diagram illustrating an external appearance of an electronic device according to an exemplary embodiment of the present invention.

FIG. 1 is a diagram illustrating an external appearance of an electronic device according to an exemplary embodiment.

In the embodiment, an electronic device 10 (portable terminal such as a smart phone) can be connected to a server 27 via the Internet 26 to acquire a desired information from the server 27.

The information acquired from the server 27 via the Internet 26 is output to an image display module (LCD) 17, which will be described below.

Herein, the embodiment will be described using a portable terminal as an electronic device 11, but is not limited thereto, and may also be applied to other types of devices such as a notebook type PC, an electronic device such as a mobile phone, and a portable TV.

In this embodiment, the portable terminal 10 A includes an imaging device (camera) 30 provided in a back surface of the LCD 17.

Figure 3:
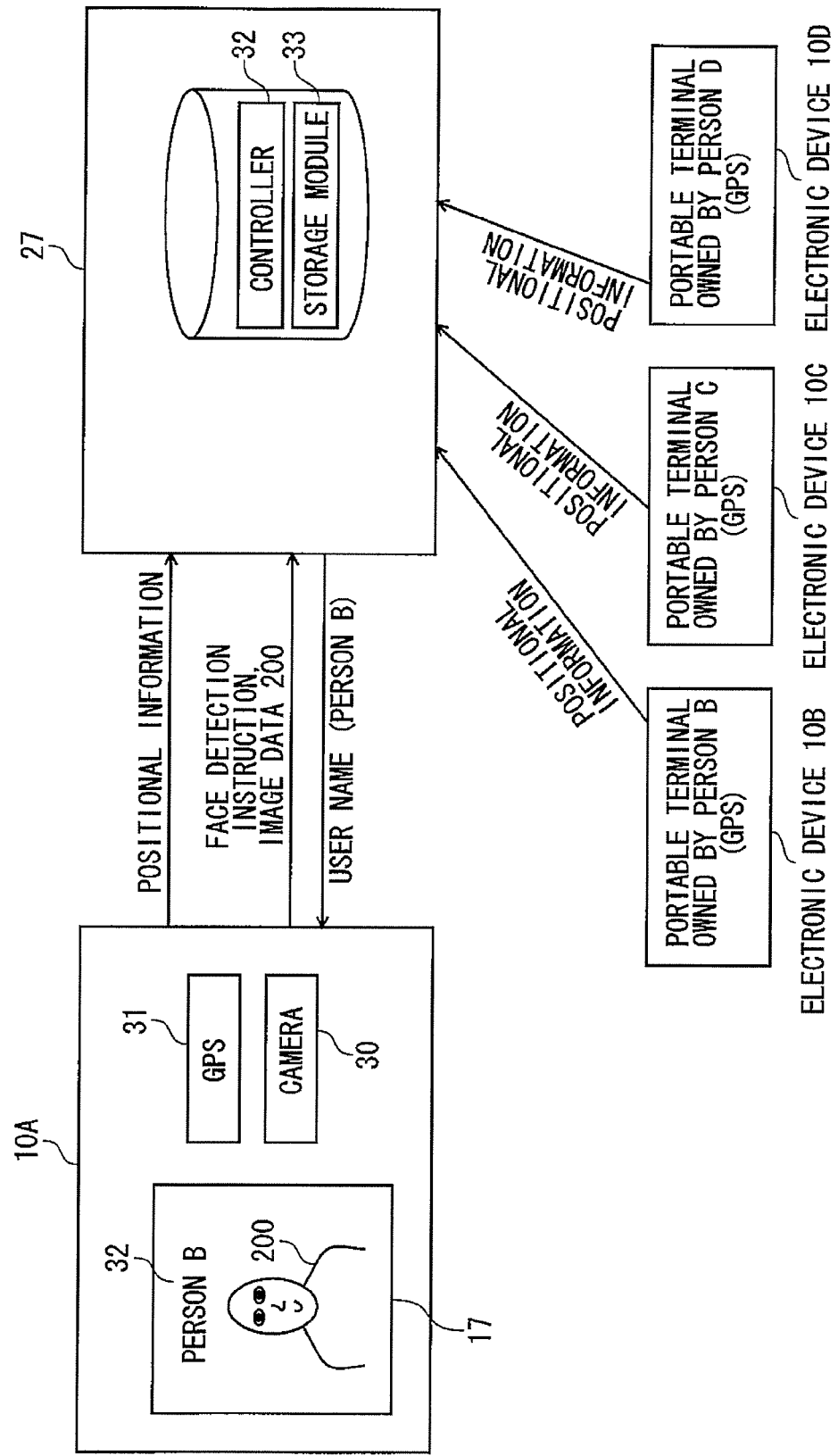
FIG. 3 is a diagram illustrating an example of a system including the electronic device and a server according to the exemplary embodiment.

For example, the portable terminal 10 acquires an image of a desired person for detecting his or her name (a first person 200 named B), and transmits the acquired image to the server 27 via the Internet 26. The portable terminal 10 then displays the user name detected by and transmitted from the server 27 in parallel with the image of the first person on the LCD 17, as illustrated in FIG. 3.

As described hereinafter, the "user name" is a name that is individually registered with each of a plurality of the electronic devices (portable terminals) in advance.

The "user name" is preferably an original name. However, any name which can be specified may be designated as a user of the electronic device depending on an operation situation.

Further, the "user name" may be a personal information whose publication is limited to a particular time or place (employment seminar, party place).

Figure 2:
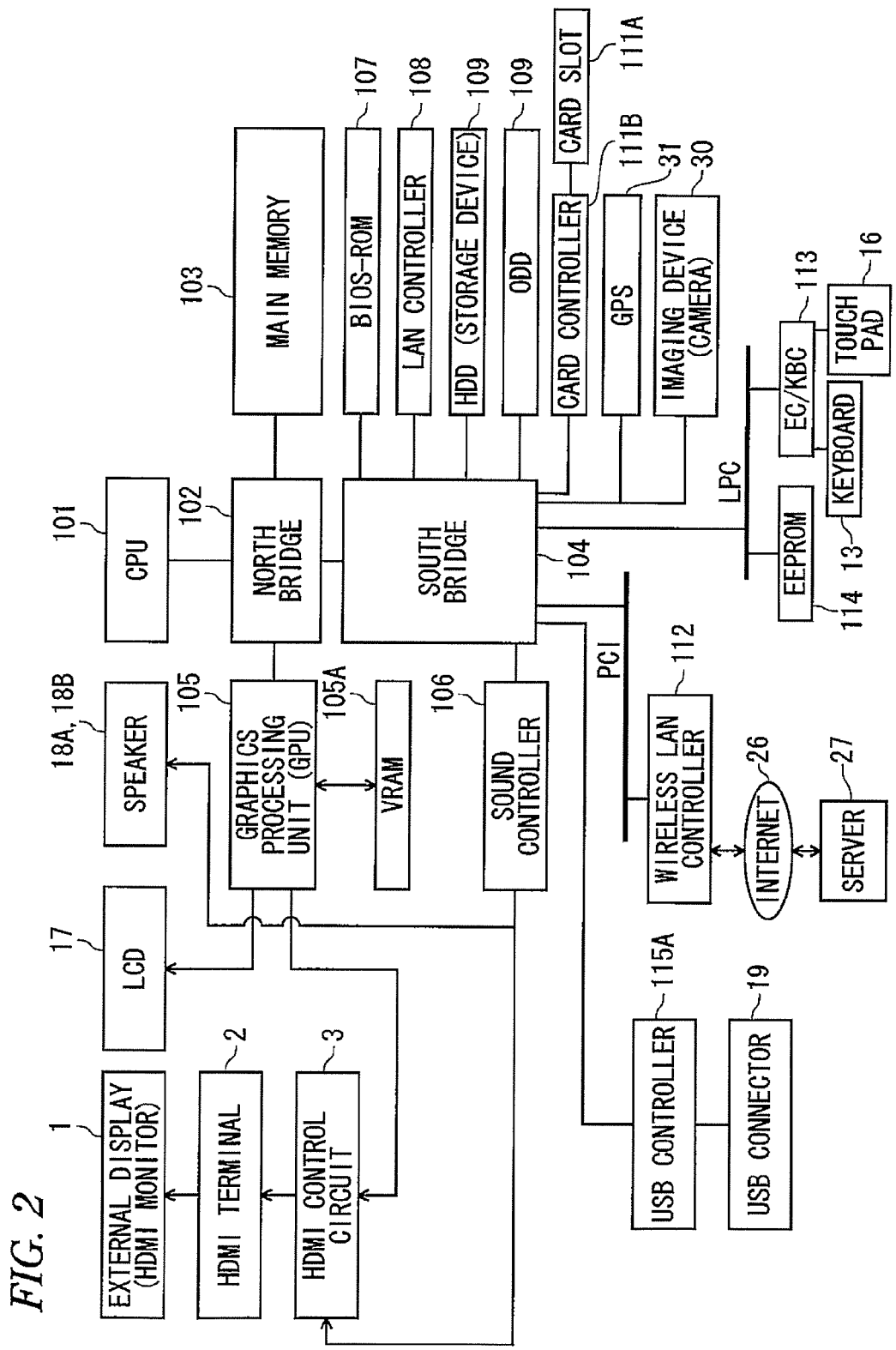
FIG. 2 is a block diagram illustrating an example of a configuration of the electronic device according to the exemplary embodiment.

FIG. 2 is a block diagram illustrating a configuration of the electronic device according to the exemplary embodiment.

The portable terminal 10 includes a central processing unit (CPU) 101, a north bridge 102, a main memory 103, a south bridge 104, a graphics processing unit (GPU) 105, a RAM (video RAM) 105A, a sound controller 106, a basic input/output system read only memory (BIOS-ROM) 107, a local area network (LAN) controller 108.

The portable terminal 10 further includes a hard disk drive (HDD) 109, an optical disk drive (ODD) 110, a USB controller 115A, a card slot 111A, a card controller 111B, a wireless LAN controller 112, an embedded controller/keyboard controller (EC/KBC) 113, and an electrically erasable programmable ROM (EEPROM) 114.

The CPU 101 is a processor that controls operations of the respective components in the portable terminal 10.

The CPU 101 executes BIOS which is a program for controlling hardware stored in the BIOS-ROM 107.

The north bridge 102 is a bridge device which connects a local bus of the CPU 101 and the south bridge 104. The north bridge 102 also incorporates a memory controller which controls an access to the main memory 103. The north bridge 102 also has a function of communicating with the GPU 105 via, for example, a serial bus compatible with a PCI EXPRESS standard.

The GPU 105 is a display controller controlling the LCD 17 used as a display monitor of the portable terminal 10.

A display signal generated by the GPU 105 is sent to the LCD 17. The GPU 105 may transmit a digital image signal to an external display 1 through an HDMI control circuit 3 and an HDMI terminal 2.

The HDMI terminal 2 is a connection terminal of the aforementioned external display. The HDMI terminal 2 may transmit an uncompressed digital image signal and a digital audio signal to the external display 1 such as a television over single cable. The HDMI control circuit 3 is an interface for transmitting the digital image signal to the external display 1 called an HDMI monitor through the HDMI terminal 2.

The south bridge 104 controls each device on a peripheral component interconnect (PCI) bus and each device on a low pin count (LPC) bus. The south bridge 104 incorporates an integrated drive electronics (IDE) controller for controlling the HDD 109 and the ODD 110.

The south bridge 104 has a function to execute communication with the sound controller 106 as well.

The sound controller 106 is a sound source device and outputs audio data to be reproduced to speakers 18A and 18B or the HDMI control circuit 3. The LAN controller 108 is, for example, a wired communication device that executes wired communication of an IEEE 802.3 standard. In the meantime, the wireless LAN controller 112 is, for example, a wireless communication device that executes wireless communication of an IEEE 802.11g standard. The USB controller 111A executes communication with, for example, an external apparatus (which is connected via a USB connector 19) compatible with a USB 2.0 standard.

For example, the USB controller MA is used to receive an image data file stored in a digital camera. The card controller 111B writes and reads data into and from a memory card such as an SD card inserted into a card slot provided in a computer (notebook PC) body 11.

The EC/KBC 113 is a single-chip micro computer in which an embedded controller for power management and a keyboard controller for a keyboard 13 as well as a touch pad 16 are integrated together. The EC/KBC 113 has a function to power-ON/OFF the portable terminal 10 according to a manipulation of a power button 14 by a user.

In this embodiment, for example, the portable terminal 10 executes a program recorded in the main memory 103 or the HDD 109 to perform a display control in the embodiment.

The above-described configuration of the electronic device is illustrative only, and the electronic device may be configured by hardware different from those components of the above-described configuration of the electronic device.

FIG. 3 is a diagram illustrating an example of the electronic device and a server according to an embodiment.

As illustrated in FIG. 3, a plurality of the electronic devices (e.g., an electronic device (portable terminal 10A), an electronic device (portable terminal 10B), an electronic device (portable terminal 10C) and the like)) are connected with the server 27 and the positional information of each of the plurality of the electronic devices is transmitted from the electronic devices to the server 27.

The positional information is transmitted, for example, once every five minutes, once every ten minutes or once every one hour.

The positional information of the portable terminals 10A, 10B, 10C and 10D are, for example, information acquired by a GPS unit which are provided in each of the portable terminals 10A, 10B, 10C and 10D.

GPS stands for Global Positioning Systems and positional information such as longitude and latitude can be acquired using GPS.

In this embodiment, an image of a desired person for detecting his or her name (a first person 200 named B) is captured using the camera 30 of the portable terminal 10A and transmitted to the server 27 via the Internet 26.

The user name detected by and transmitted from the server 27 is displayed on the LCD 17 in parallel with the image of the first person (e.g., a person named B 200), as illustrated in FIG. 3.

That is, an image of a desired person for detecting user name (a first person 200 named B) is acquired by, for example, the camera 30 of the portable terminal 10A to create an image data.

Furthermore, the image data may be created in advance and stored in the portable terminal 10A.

An instruction to detect user name of the first person (a person named B 200) is output to the server 27 from the portable terminal 10A according to a manipulation of the portable terminal 10A by the user.

In this case, positional information of the portable terminal 10A and an image data such as a face of the first person are output from the portable terminal 10A to the server 27.

The positional information of the portable terminal 10A is, for example, information which is acquired by the GPS unit 31 provided in the portable terminal 10A.

The server 27 receives an instruction to detect user name of the first person (a person named B 200), the positional information of the portable terminal 10A and the image data such as the face of the first person that are transmitted from the portable terminal 10A.

The server 27 extract information about the portable terminals existing within a predetermined range from the portable terminal 10A using the received positional information of the portable terminal 10A.

The server 27 further detects the first person (person B) by detecting persons who are associated with the extracted portable terminals using the image data of the first person.

Further, the server 27 outputs the user name of the detected first person (person B).

Figure 4:
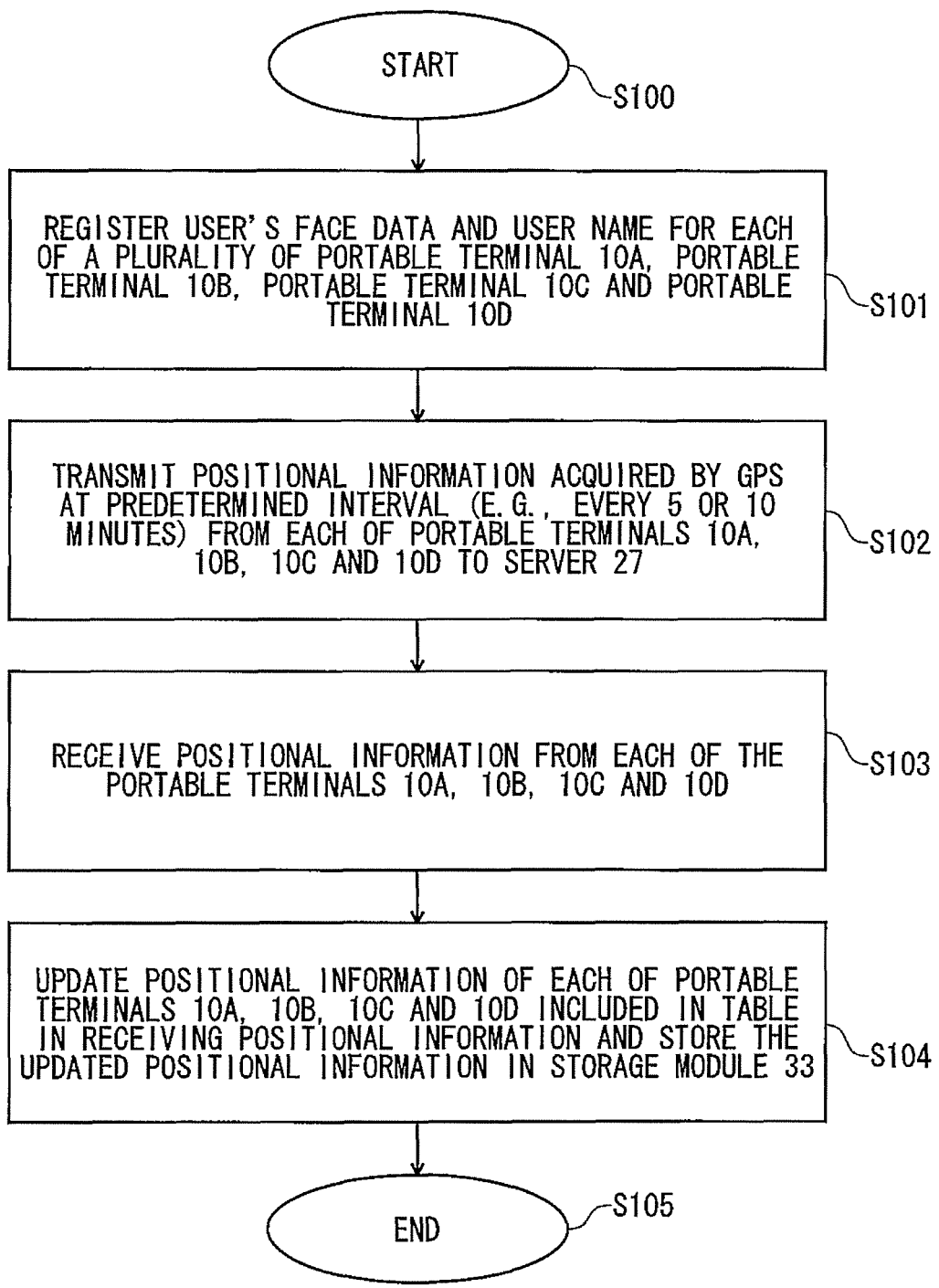
FIG. 4 is a flowchart illustrating a process for acquiring positional information from a plurality of the electronic devices at the server according to the exemplary embodiment.

FIG. 4 is a flowchart illustrating a process for acquiring positional information from a plurality of the electronic devices at the server according to the exemplary embodiment.

The process starts from step S100, and subsequently proceeds to step S101.

At step S101, "user's face data" and "user name" are registered for each of the plurality of the portable terminal 10A, portable terminal 10B, portable terminal 10C and portable terminal 10D, respectively.

As illustrated in FIG. 5, a person named A corresponding to portable terminal 10A and a person named B corresponding to portable terminal 10B are registered with the server, respectively, which will be described below.

Such registrations are stored in the storage module 33 controlled by the controller 32 of the server 27.

Subsequently, the process proceeds to step S102.

At step S102, positional information acquired by GPS is transmitted at a predetermined interval (e.g., every 5 or 10 minutes) from each of the portable terminals 10A, 10B, 10C and 10D to the server 27. Subsequently, the process proceeds to step S103.

At step S103, the server 27 receives the positional information from each of the portable terminals 10A, 10B, 10C and 10D. Subsequently, the process proceeds to step S104.

At step S104, the server 27 updates the positional information of each of the portable terminals 10A, 10B, 10C and 10D (corresponding to each user) included in a table illustrated, for example, in FIG. 5 in receiving the positional information and stores the updated positional information in the storage module 33. Subsequently, the process proceeds to step S105.

At step S105, the process is ended.

As described above, the server 27 receives, from the plurality of the portable terminals 10A, 10B, 10C and 10D, the positional information about them, and updates the received positional information to be stored on the table (FIG. 5) of the storage module 33.

FIG. 5 is a diagram illustrating an example of a table having information about the plurality of the electronic devices stored therein and is installed in a storage module of the server according to the exemplary embodiment.

The "electronic device" 51 listed in the table shown in FIG. 5 represents electronic devices that are registered in a table of the server 27. In FIG. 5, for example, the portable terminals 10A, 10B, 10C and 10D are registered with the table.

The "user name" 52 represents "user name data" that are registered with the table. In the table, for example, user names A, B, C and D are registered in the table as the portable terminals 10A, 10B, 10C and 10D, respectively.

The "face data" 53 represents "face data" that are registered in the table. For example, face data as illustrated in FIG. 5 are registered in the table as users' faces of the portable terminals 10A, 10B, 10C and 10D, respectively.

The "positional information" 54 represents "positional information" that are registered in the table. For example, "longitude OO, latitude XX", "longitude OX, latitude OX", "longitude OΔ, latitude OΔ", and "longitude XO, latitude XΔ" are registered in the table as positional information of the portable terminals 10A, 10B, 10C and 10D, respectively.

Figure 6:
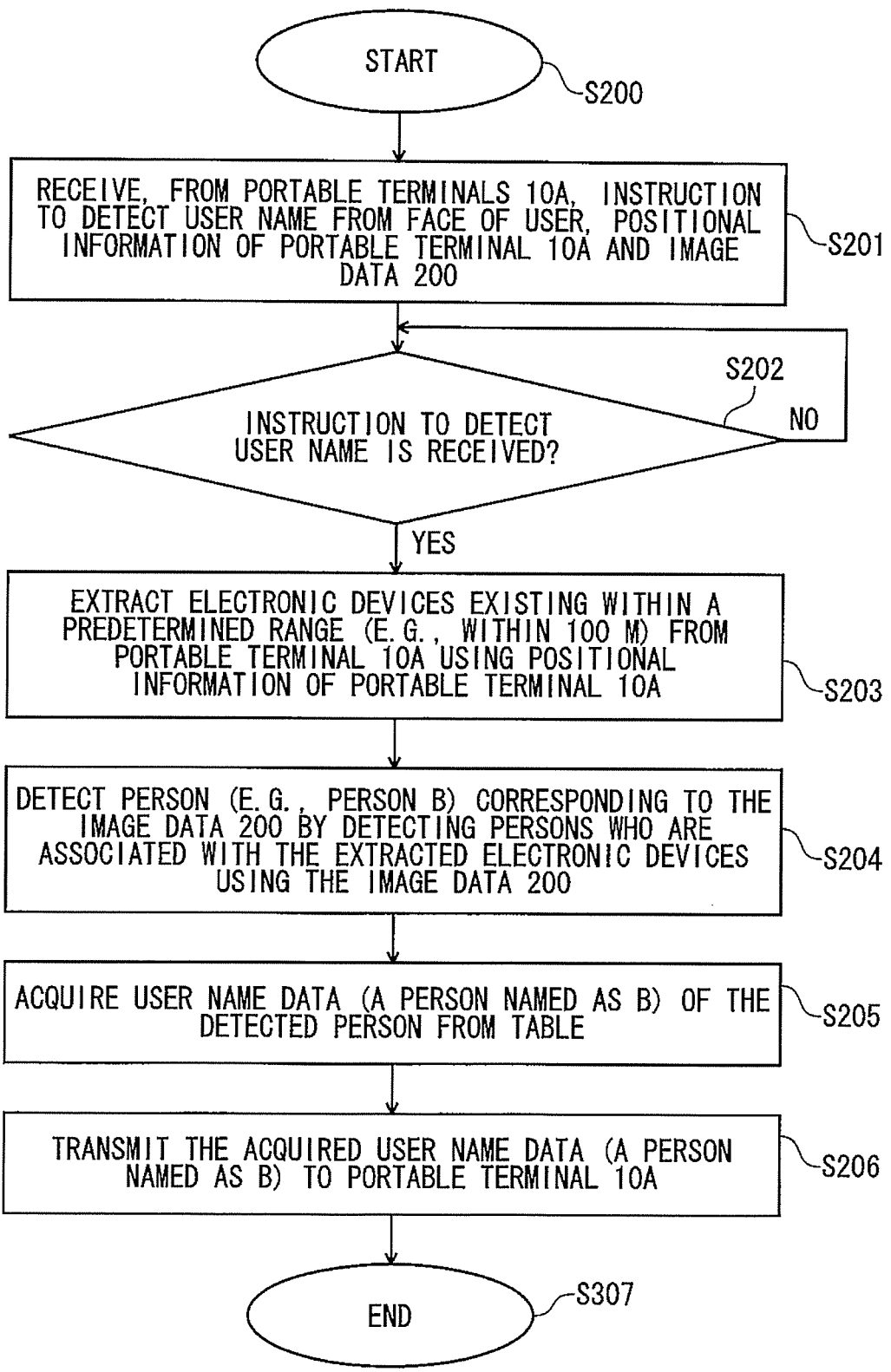
FIG. 6 is a flowchart illustrating a process of the server according to the exemplary embodiment.

FIG. 6 is a flowchart illustrating a process of the server according to the exemplary embodiment.

The process starts from step S200. Subsequently, the process proceeds to step S201.

At step S201, the server 27 receives an instruction to detect user name from a face of a user transmitted from the portable terminals 10A, positional information of the portable terminal 10A and an image data of a face of a person to be detected 200. Subsequently, the process proceeds to step S202.

At step S202, it is determined whether the instruction to detect user name is received. If it is determined that the user name is received, the process proceeds to step S203 ("Yes" at step S202). If it is determined that the user name is not received, the process repeatedly performs step S202 ("No" at step S202).

At step S203, electronic devices existing within a predetermined range (e.g., within 100 m) from the portable terminal 10A is extracted using the positional information of the portable terminal 10A. Subsequently, the process proceeds to step S204.

At step S204, a person (e.g., person B) corresponding to the image data 200 is detected by detecting persons who are associated with the extracted electronic devices using the image data 200. Subsequently, the process proceeds to step S205.

At step S205, user name data (a person named as B) of the detected person is acquired from the table shown in FIG. 5. Subsequently, the process proceeds to step S206.

At step S206, the acquired user name data (a person named as B) is transmitted to the portable terminal 10A. Subsequently, the process proceeds to step S207.

At step S207, the process is ended.

Figure 7:
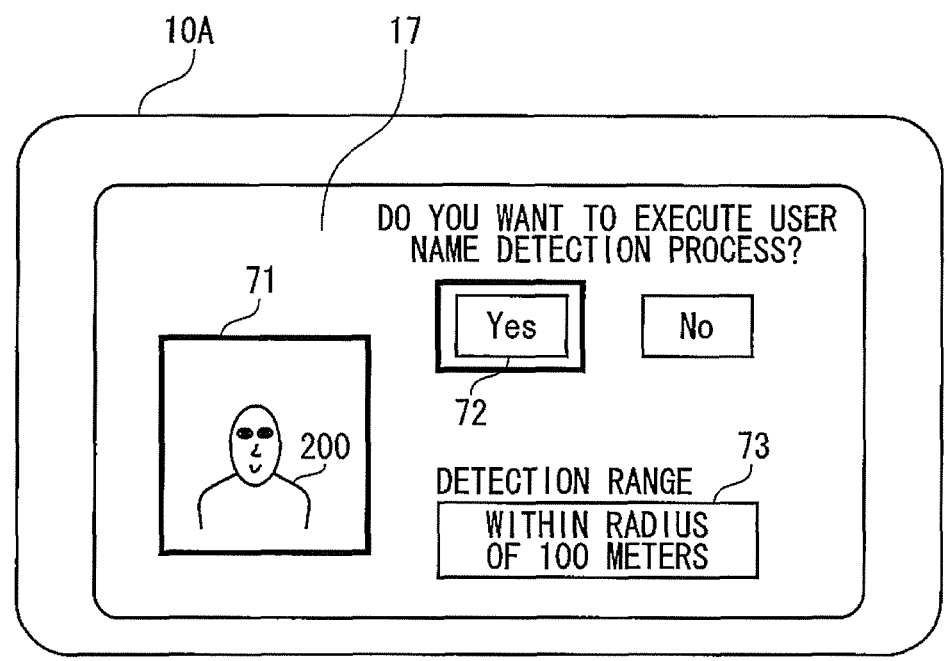
FIG. 7 is a diagram illustrating an example of an instruction screen used for instructing the server to perform a user name detection process in the electronic device according to the exemplary embodiment.

FIG. 7 is a diagram illustrating an example of an instruction screen which is used for instructing the server to perform a user name detection process in the electronic device according to the exemplary embodiment.

As illustrated in FIG. 7, "user name detection image", that is, an image of a detected person (a first person) is displayed on the image display module 17 of the portable terminal 10A.

The user name detection image 71 may be an image data acquired by the camera 30 or an image data transmitted from other electronic devices and stored in the portable terminal 10A.

For example, "Do you want to execute user name detection process?" is displayed and the user can select "Yes" or "No" button.

As illustrated in FIG. 7, "Yes" button 72 has been selected.

When the "Yes" button 72 is selected, an instruction to detect user name of the first person is output.

In this embodiment, it is possible to set or change the detection range of the first person.

In this embodiment, for example, the detection range is set within 100 meters from the portable terminal 10A.

As described above, the server 27 performs the face detection process while limiting a detection target to persons who are present within 100 m of the portable terminal 10A.

With this configuration, it is possible to reduce a time required for the electronic device to acquire information from the server and improve an accuracy of the face detection.

Figure 8:
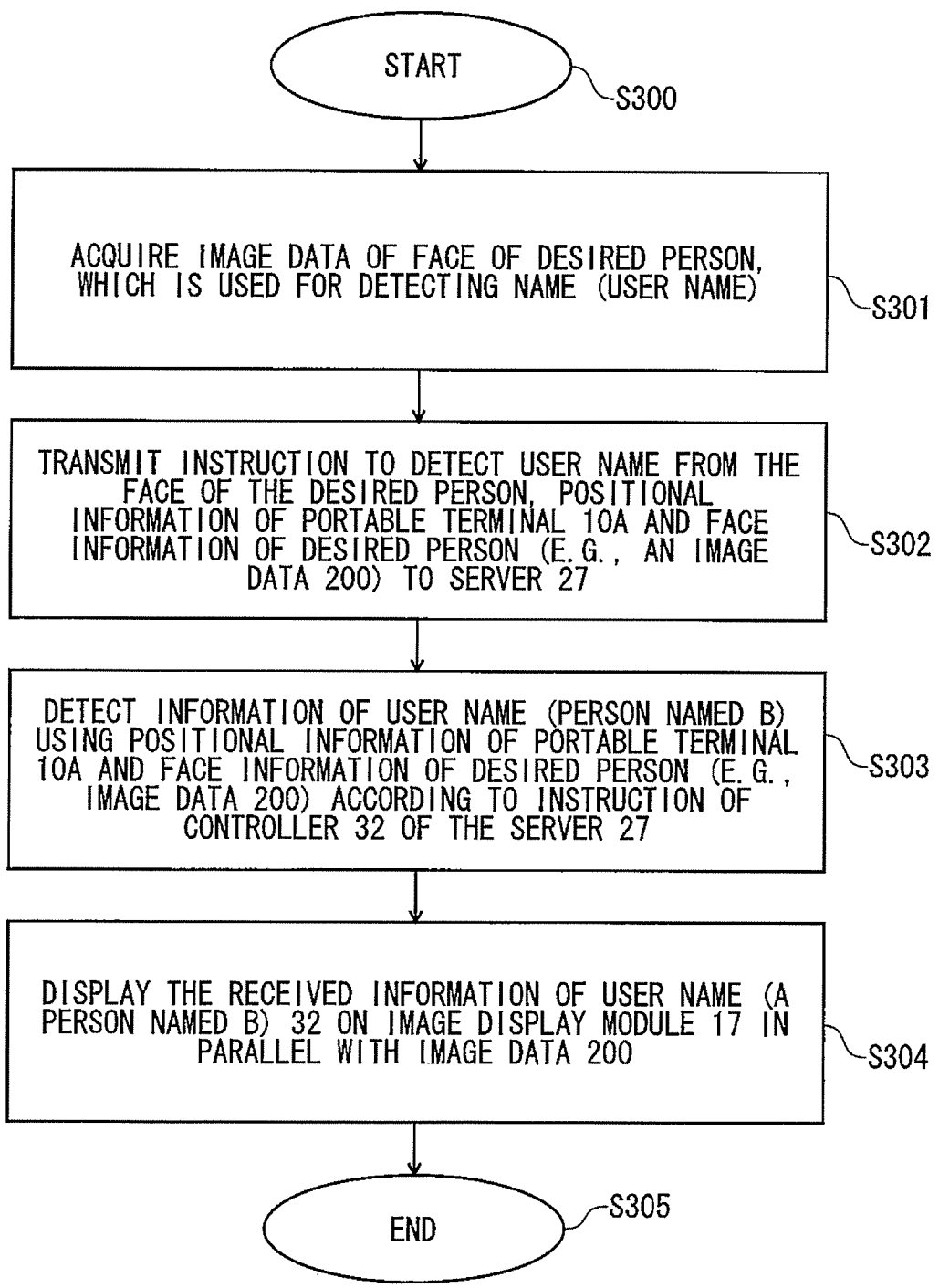
FIG. 8 is a flowchart illustrating a process for instructing to detect user name and displaying of the detected user name in the electronic device according to the exemplary embodiment.

FIG. 8 is a flowchart illustrating a process for instructing to detect user name and displaying the detected user name in the electronic device according to the exemplary embodiment.

The process starts from step S300, and subsequently proceeds to step S301.

At step S301, an image data of a face of a desired person, which is used for detecting a name (user name), is acquired. Subsequently, the process proceeds to step S302.

At step S302, an instruction to detect user name from the face of the desired person, positional information of the portable terminal 10A and face information of the desired person (e.g., an image data 200) are transmitted to the server 27. Subsequently, the process proceeds to step S303.

At step S303, information of user name (a person named B) is detected using positional information of the portable terminal 10A and face information of the desired person (e.g., image data 200) according to an instruction of, for example, the controller 32 of the server 27.

The information of user name (a person named B) is transmitted from the server 27 to the portable terminal 10A. Subsequently, the process proceeds to step S304.

At step S304, the received information of user name (a person named B) 32 is displayed on the image display module 17 in parallel with the image data 200, as illustrated in FIG. 3. Subsequently, the process proceeds to step S305.

At step S305, the process is ended.

In this embodiment, each of the plurality of the portable terminals A, B, C and D transmits the positional information to the server at a certain period, for example.

Further, for example, the electronic device A can acquire images around the desired user and displays the acquired images on the image display module 17.

For example, the electronic device A transmits an instruction to detect user name, positional information of the desired user and image of the desired user to server 27.

The server 27 detects the desired user existing within a predetermined range (e.g., within 100 meters) from the transmitted positional information (positional coordinates)

The server 27 performs face detection process on the image of the detected user.

When the face of the desired user is found in the face detection process, the server 27 transmits the positional information and the name information to the portable terminal 10A.

The portable terminal 10A displays name information (the user name) along with the image data of the desired user. That is, in this embodiment, the server 27 includes a receiver that receives, for example, an instruction to detect the user name of the first person (a person named B) output from the portable terminal 10A, positional information of the portable terminal 10A and the image data of the first person (a person named B).

The server 27 includes an extractor (e.g., controller 32) that extract information of the portable terminals having positional information within a predetermined range from the portable terminal 10A using the received positional information of the portable terminal 10A.

The server further includes a detector (e.g., controller 32) that detects the first person by performing a face detection process on persons who are associated with the extracted electronic devices using the image data of the first person.

The server further includes an output module (e.g., storage module 33) that outputs user name data of the detected person.

The server 27 further includes a storage module 33 that receives, from the registered electronic devices, the positional information about them.

The server 27 further includes a table (see FIG. 5) containing user name data, face data and positional data.

In this embodiment, the positional information of the plurality of the electronic devices includes GPS data.

The electronic device outputs an instruction to detect user name of the first person, positional information of the electronic device and the image data of the first person, receives user name data output from the server 27 and outputs the received user name data and the image data of the first person in parallel (user name 32 in FIG. 3).

That is, it is possible to display the user name on the image data of the first person using AR.

AR stands for Augmented Reality and also called extended reality.

AR indicates a technique that augments the real environment with additional information using a computer, or an environment in which additional information is added to augment the real scene.

With the configuration described above, it is possible to reduce a time required for the electronic device to acquire information from the server in the embodiment.

All of the control sequences of the embodiment may be executed by software. Therefore, it is possible to easily realize the same effect as the embodiment only by executing the program installed in a personal computer through a computer readable recording medium.

While certain embodiments have been described, these embodiments have been presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the sprit of the invention. The accompanying claims and their equivalents are intended to cover such forms or modifications as would fall within the scope and sprit of the invention.

What is claimed is:

1. A server, comprising:
a storage module configured to store information associated with each of a plurality of electronic devices, the stored information associated with a first electronic device of the plurality of electronic devices comprises a name identifying a user of the first electronic device, face data that comprises a facial image of the user of the first electronic device, and geographic position information for the first electronic device;
a receiver configured to receive, from a second electronic device of the plurality of electronic devices, an instruction signal instructing the server to detect the name of the user of the first electronic device, in response to receiving the positional information of the second electronic device and the facial image of the user of the first electronic device;
an extractor configured to extract information associated with one or more of the plurality of electronic devices existing within a certain range from the second electronic device based on the positional information sent from the second electronic device and at least the, positional information for the first electronic device stored in the server;
a detector configured to perform a face detection on facial images of one or more users associated with the one or more extracted electronic devices using the facial image of the user of the first electronic device; and
an output module configured to output the name of the user of the first electronic device based on a result of the face detection.

2. The server of claim 1, wherein the one or more of the plurality of electronic devices being lesser in number than the plurality of electronic devices.

3. The server of claim 1, wherein the certain range includes a range of one hundred meters or less from the positional information associated with the second electronic device of the plurality of electronic device.

4. The server of claim 1, wherein the positional information of the first electronic device and the positional information of the second electronic device comprises global positioning satellite (GPS) information.

5. A server control method, comprising:
(a) receiving, from an electronic device of a plurality of electronic devices, an instruction signal instructing a server to detect a name of a user of the electronic device, in response to receiving positional information of the electronic device and a facial image of the user of the electronic device;
(b) extracting information associated with one or more of the plurality of electronic devices existing within a certain range from the electronic device based on the positional information sent from the electronic device and at least the positional information for the first electronic device stored in the server;
(c) performing face detection on facial images of one or more users associated with the one or more extracted electronic devices using the facial image of the user of the first electronic device; and
(d) outputting the name of the user of the electronic device based on a result of the face detection.

6. A non-transitory computer-readable medium storing a server control program for causing the computer to perform operations comprising:

(a) receiving, from an electronic device of a plurality of electronic devices, an instruction signal instructing a server to detect a name of a user of the electronic device in response to receiving positional information of the electronic device and a facial image of the user of the electronic device;
(b) extracting information associated with one or more of the plurality of electronic devices existing within a certain range from the electronic device based on the positional information sent from the electronic device and at least the positional information for the first electronic device stored in the server;
(c) performing face detection on facial images of one or more users associated with the one or more extracted electronic devices using the facial image of the user of the first electronic device; and
(d) outputting the name of the user of the electronic device based on a result of the face detection.

7. The server control method of claim 5, wherein the certain range includes a range of one hundred meters or less from the positional information associated with the electronic device of the plurality of electronic devices.

8. The server control method of claim 5, wherein the positional information of the first electronic device and the positional information of the electronic device comprises global positioning satellite (GPS) information.

9. The non-transitory computer-readable medium of claim 6, wherein the certain range includes a range of one hundred meters or less from the positional information associated with the electronic device of the plurality of electronic devices.

10. The non-transitory computer-readable medium of claim 6, wherein the positional information of the first electronic device and the positional information of the electronic device comprises global positioning satellite (GPS) information.

* * * * *